United States Patent
Shaked et al.

(10) Patent No.: US 11,256,699 B2
(45) Date of Patent: Feb. 22, 2022

(54) GRAMMAR-BASED SEARCHING OF A CONFIGURATION MANAGEMENT DATABASE

(71) Applicant: ServiceNow, Inc., Santa Clara, CA (US)

(72) Inventors: Olga Shaked, Petah Tiqwa (IL); Lior Urman, Mevaseret Zion (IL)

(73) Assignee: ServiceNow, Inc., Santa Clara, CA (US)

( * ) Notice: Subject to any disclaimer, the term of this patent is extended or adjusted under 35 U.S.C. 154(b) by 381 days.

(21) Appl. No.: 16/373,419

(22) Filed: Apr. 2, 2019

(65) Prior Publication Data

US 2020/0233862 A1 Jul. 23, 2020

Related U.S. Application Data

(60) Provisional application No. 62/795,962, filed on Jan. 23, 2019.

(51) Int. Cl.
*G06F 16/2455* (2019.01)
*G06F 16/22* (2019.01)
(Continued)

(52) U.S. Cl.
CPC ...... *G06F 16/2455* (2019.01); *G06F 16/2282* (2019.01); *G06F 16/285* (2019.01); *G06F 40/284* (2020.01); *G06K 9/6267* (2013.01)

(58) Field of Classification Search
CPC .............. G06F 16/2455; G06F 16/285; G06F 16/2282; G06F 40/284; G06K 9/6267
(Continued)

(56) References Cited

U.S. PATENT DOCUMENTS 6,321,229 B1 11/2001 Goldman
6,895,586 B1 5/2005 Brasher
(Continued)

OTHER PUBLICATIONS

Gonzalez et al.: "Semantic representations for knowledge modelling of a Natural Language Interface to Databases using ontologies", International Journal of Combinatorial optimization Problems and Informatics, Aug. 1, 2015; pp. 28-42 (XP055682974—retrived from internet Http://www.scielo.org.mx/pdf/ijcopi/v6n2/2007-1558-ijcopi-6-02-00028.pdf).
(Continued)

*Primary Examiner* — Robert W Beausoliel, Jr.
*Assistant Examiner* — Arthur Ganger
(74) *Attorney, Agent, or Firm* — Fletcher Yoder PC

(57) ABSTRACT

A remote network management platform includes persistent storage containing representations of configuration items in a plurality of database tables. The configuration items relate to computing devices and software applications disposed within a managed network associated with the remote network management platform. The remote network management platform includes one or more server devices configured to: (i) receive a search query comprising a plurality of search terms; (ii) tokenize the search query into a plurality of tokens; (iii) apply classifiers to the plurality of tokens in a prioritized order, wherein the classifiers map each of the tokens to: one of the database tables, a column in one of the database tables, a configuration item represented in one of the database tables, or a relationship between configuration items represented in the database tables; and (iv) search the persistent storage for one or more configuration items that match the mappings produced by the classifiers.

20 Claims, 10 Drawing Sheets

(51) Int. Cl.
  *G06K 9/62* (2006.01)
  *G06F 16/28* (2019.01)
  *G06F 40/284* (2020.01)

(58) Field of Classification Search
  USPC .......................................................... 707/749
  See application file for complete search history.

(56) References Cited

U.S. PATENT DOCUMENTS

| | | | |
|---|---|---|---|
| 7,027,411 | B1 | 4/2006 | Pulsipher |
| 7,392,300 | B2 | 6/2008 | Anantharangachar |
| 7,617,073 | B2 | 11/2009 | Trinon |
| 7,945,860 | B2 | 5/2011 | Vambenepe |
| 8,224,683 | B2 | 7/2012 | Manos |
| 8,554,750 | B2 | 10/2013 | Rangarajan |
| 8,862,458 | B2* | 10/2014 | Freising .............. G06F 16/3334 704/9 |
| 2007/0203952 | A1* | 8/2007 | Baron ..................... G06Q 10/06 |
| 2019/0102390 | A1* | 4/2019 | Antunes ................. G06F 40/295 |
| 2019/0272296 | A1* | 9/2019 | Prakash ................. G06F 16/243 |
| 2020/0074000 | A1* | 3/2020 | Vernier ................... G06F 16/93 |
| 2020/0264868 | A1* | 8/2020 | Thakkar ............. G06F 11/3616 |
| 2021/0019309 | A1* | 1/2021 | Yadav .................. G06F 16/245 |

OTHER PUBLICATIONS

Pazos R., et al.: Comparative study on the customization of natural langaugae interfaces to databases:, SPRINGERPLUS, vol. 5, No. 1, Apr. 30, 2016 (XP055683685).

Nihalini et al., "Natural language Interface for Database: A Brief review"; IJCSI International Journal of Computer Science Issues, vol. 8, Issue 2, Mar. 1, 2011, pp. 600-608 (SP055081542—retrived from internet http://ijcsi.org/papers/IJCSI-8-2-600-608.pdf.}.

International Search Report and Written Opinion for PCT Application No. PCT/2020/014286 dated Apr. 20, 2020; 14 pgs.

* cited by examiner

GRAMMAR-BASED SEARCHING OF A CONFIGURATION MANAGEMENT DATABASE

CROSS-REFERENCE TO RELATED APPLICATION

This application claims priority to U.S. provisional patent application No. 62/795,962, filed Jan. 23, 2019, which is hereby incorporated by reference in its entirety.

BACKGROUND

A managed network may use tens, hundreds, or thousands of individual computing devices to facilitate interrelated or standalone operations. A configuration management database (CMDB) may include configuration items associated with these devices. That is, the configuration management database may include representations of the computing devices, the software applications installed on the computing devices, relationships therebetween, and configurations thereof. Such configuration items might be used by the managed network to more efficiently carry out information technology service management, information technology operations management, configuration management, and other operations.

Users of the managed network may wish to locate configuration items in order to read, update, edit, or otherwise interact with the configuration items. As the complexity of the managed network increases, so too may the complexity of the configuration items and their interrelationships in the CMDB. Thus, it may be difficult to locate a particular configuration item or particular data records of configuration items without prior knowledge of specific attributes of the configuration item or its records.

SUMMARY

The embodiments herein relate to various techniques that can be used for searching a CMDB to locate and access configuration items, for instance. A client device associated with the managed network may interact with a search tool that facilitates receiving and processing a search query and returning one or more records of a configuration item based on the search query. The search tool tokenizes the search query by converting the search query into a series of tokens. By default, each search term corresponds to a separate token. However, the search tool may group terms together into a single token in some examples, such as for multi-word phrases that are commonly used in plain language or that are known to be used in configuration items or metadata associated with the configuration items. The search tool then classifies each token of the tokenized query as a particular token type. The search tool may determine the token types in accordance with a predefined mapping scheme that maps particular terms or groups of terms to particular token types. The mapping scheme may include a list of terms and groups of terms associated with each token type, and/or the mapping scheme may include logical operations for evaluating whether a given term or group of terms is associated with a given token type. In some cases, the mapping can be carried out by way of user-defined or system-provided program code that is capable of performing more complex operations to determine a mapping.

Once the search tool determines the token types for the terms in a search query, the search tool may identify a search strategy for searching the CMDB. The search tool may identify the search strategy based on the determined token types and/or based on their relative position within the search query. For instance, the search tool may be provisioned with or have access to a number of grammar definitions, where each grammar definition represents a various arrangements of one or more token types, and where each grammar definition is further associated with a particular search strategy. As such, the search tool may determine that the token types of a search query, as well as their relative positions within the search query, adhere to a particular grammar definition, and the search tool may responsively carry out the search strategy associated with that particular grammar definition.

The search strategy may involve querying the CMDB for records of various configuration items that correspond to particular tokens of the tokenized search query. The query may be for specific records that correspond to other tokens of the tokenized search query. And the query may further take into consideration one or more relationships between the configuration items based on the tokenized search query.

Advantageously, the searching techniques described herein allow users of a managed network to search for configuration items in a CMDB using plain language search queries that do not necessarily rely on the user having specific knowledge of certain attributes of the configuration items.

Accordingly, a first example embodiment may involve persistent storage of a remote network management platform, wherein the persistent storage contains representations of configuration items that relate to computing devices and software applications disposed within a managed network associated with the remote network management platform. One or more server devices of the remote network management platform may be configured to: (i) receive, from a client device of the managed network, a search query comprising a plurality of search terms; (ii) tokenize the search query into a plurality of tokens, wherein each token of the plurality of tokens corresponds to one or more of the search terms; (iii) for each respective token of the plurality of tokens, classify the respective token as a particular token type based on the one or more search terms that correspond to the respective token, wherein classifying a first token of the plurality of tokens comprises classifying the first token as a first token type and identifying a first set of configuration items associated with the first token based on the one or more search terms that correspond to the first token, and wherein classifying a second token of the plurality of tokens comprises classifying the second token as a second token type and identifying a second set of configuration items associated with the second token based on the one or more search terms that correspond to the second token; (iv) determine an algorithm for searching the persistent storage based on (a) the token types of the plurality of tokens and (b) an arrangement of the plurality of tokens within the search query, wherein the determined algorithm involves identifying a relationship between the first set of configuration items and the second set of configuration items and, based on the identified relationship, identifying one or more configuration items from at least one of the first set of configuration items and the second set of configuration items; (v) execute the algorithm to identify the one or more configuration items from at least one of the first set of configuration items and the second set of configuration items; and (vi) transmit, to the client device and as a result of the search query, an indication of the identified one or more configuration items.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

A fifth example embodiment may involve persistent storage of a remote network management platform, wherein the persistent storage contains representations of configuration items that relate to computing devices and software applications disposed within a managed network associated with the remote network management platform. One or more server devices of the remote network management platform may be configured to: (i) receive, from a client device of the managed network, a search query comprising a plurality of search terms; (ii) tokenize the search query into a plurality of tokens, wherein each token of the plurality of tokens corresponds to one or more of the search terms; (iii) apply a set of classifiers to the plurality of tokens in a prioritized order, wherein the classifiers map each of the tokens to: one of the database tables, a column in one of the database tables, a configuration item represented in one of the columns of one of the database tables, or a relationship between configuration items represented in the database tables; (iv) search the persistent storage for one or more configuration items that match the mappings produced by the classifiers; and (v) transmit, to the client device and as a result of the search query, an indication of one or more configuration items.

In a sixth example embodiment, an article of manufacture may include a non-transitory computer-readable medium, having stored thereon program instructions that, upon execution by a computing system, cause the computing system to perform operations in accordance with the fifth example embodiment.

In a seventh example embodiment, a computing system may include at least one processor, as well as memory and program instructions. The program instructions may be stored in the memory, and upon execution by the at least one processor, cause the computing system to perform operations in accordance with the fifth example embodiment.

In a eighth example embodiment, a system may include various means for carrying out each of the operations of the fifth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
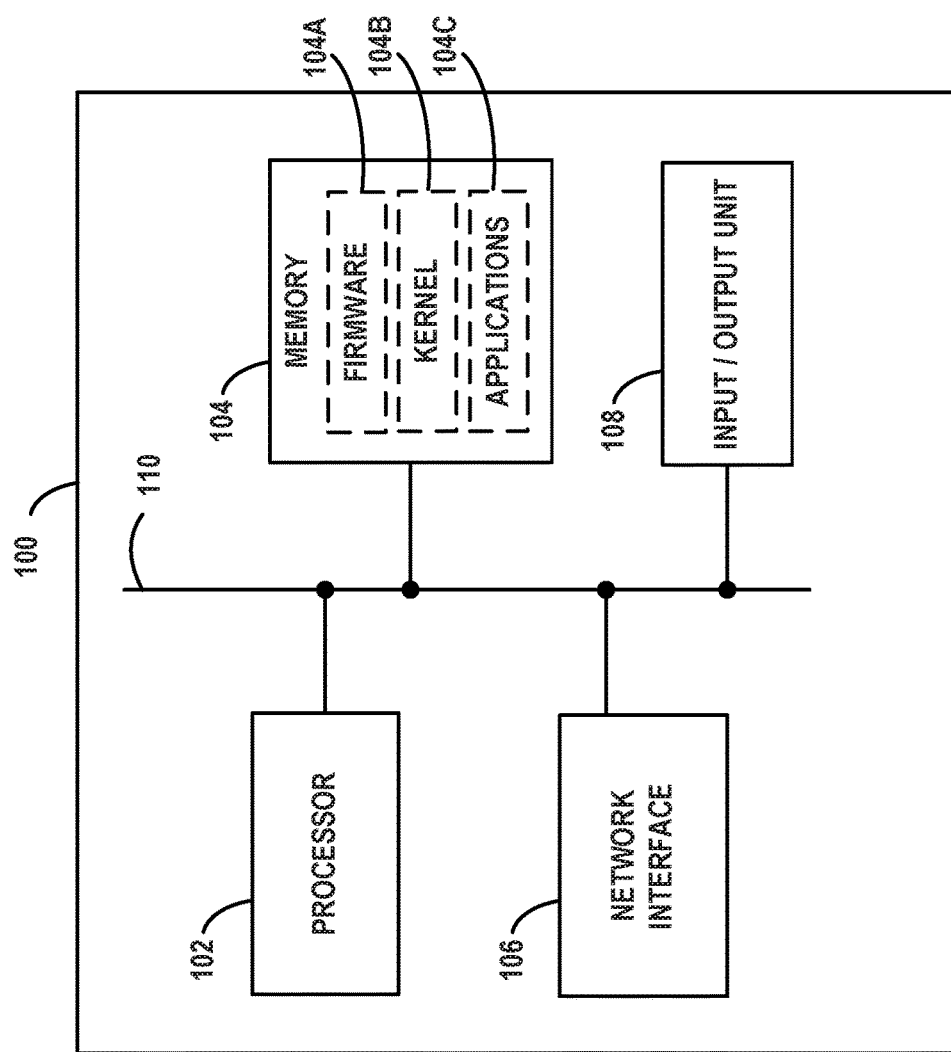
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
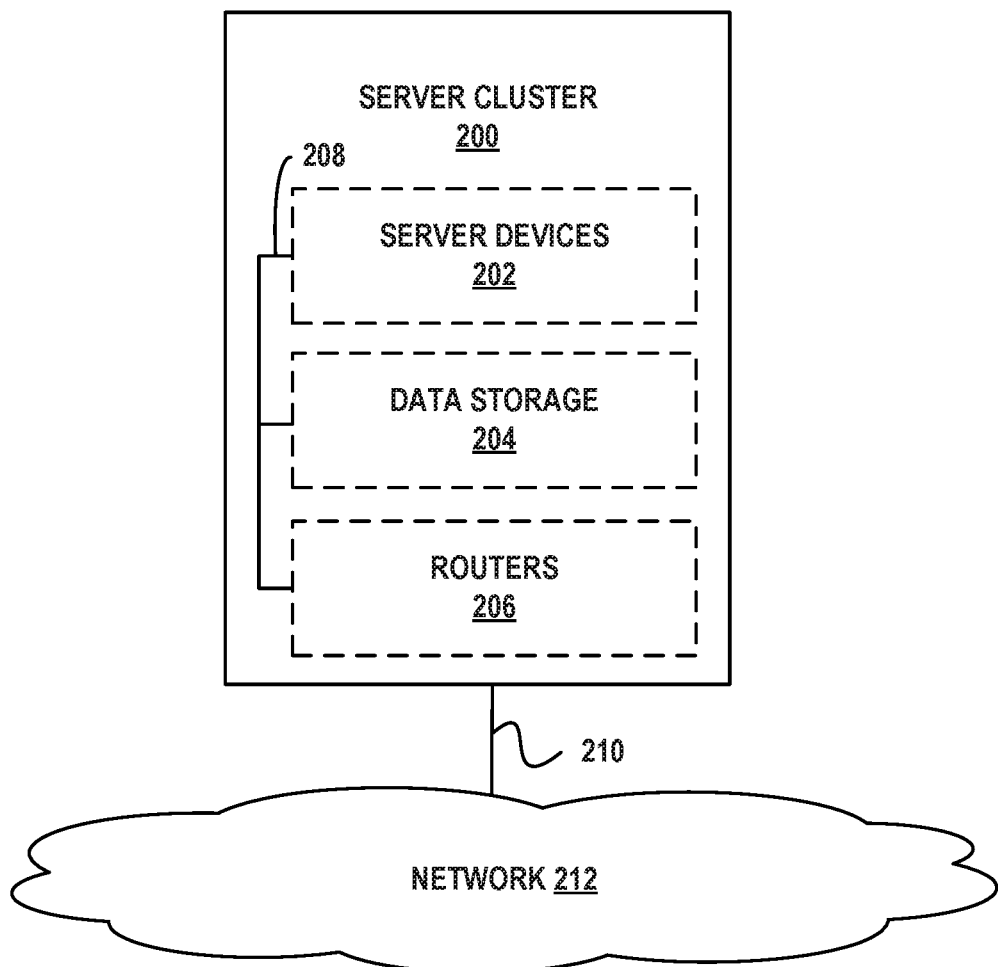
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
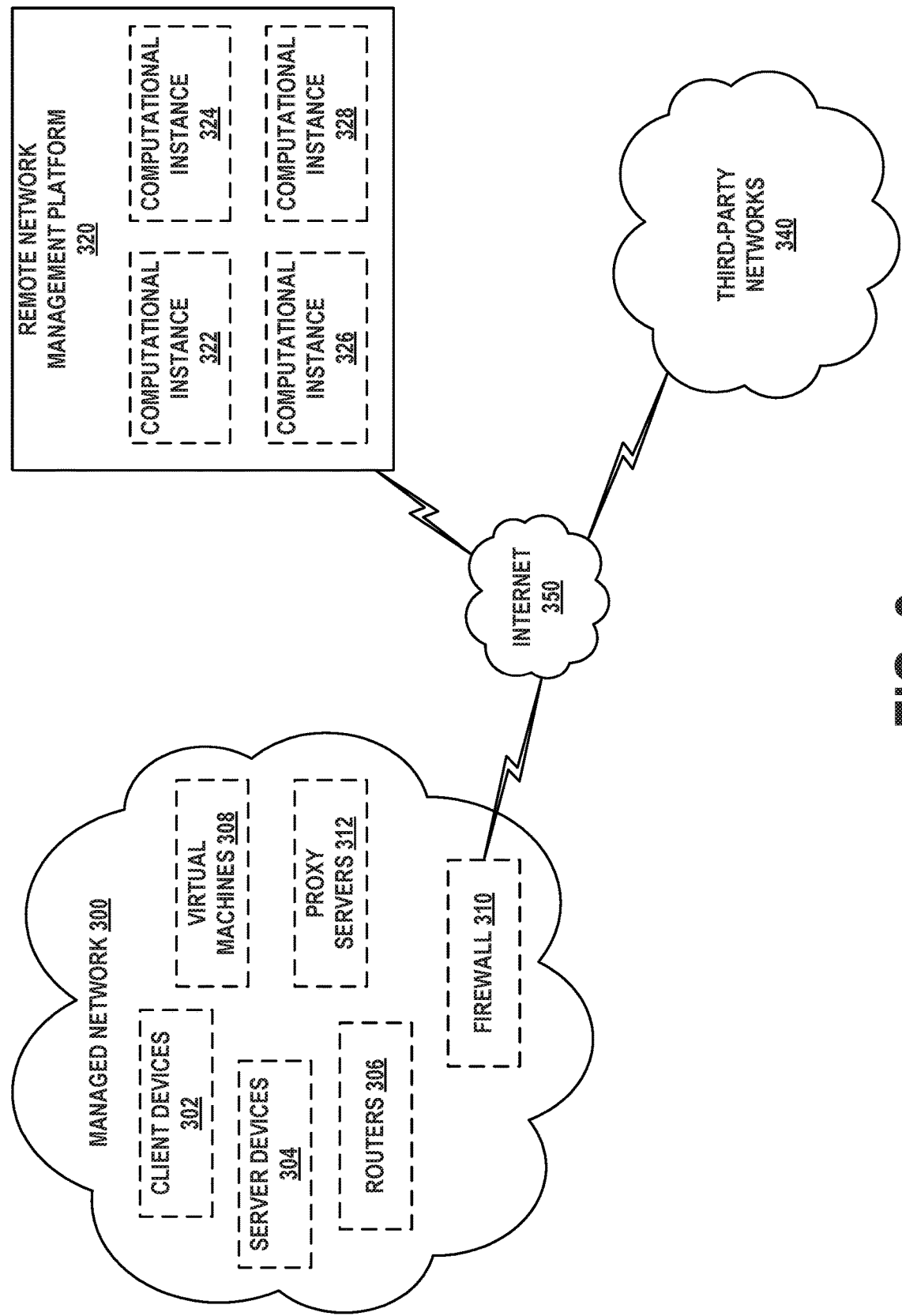
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
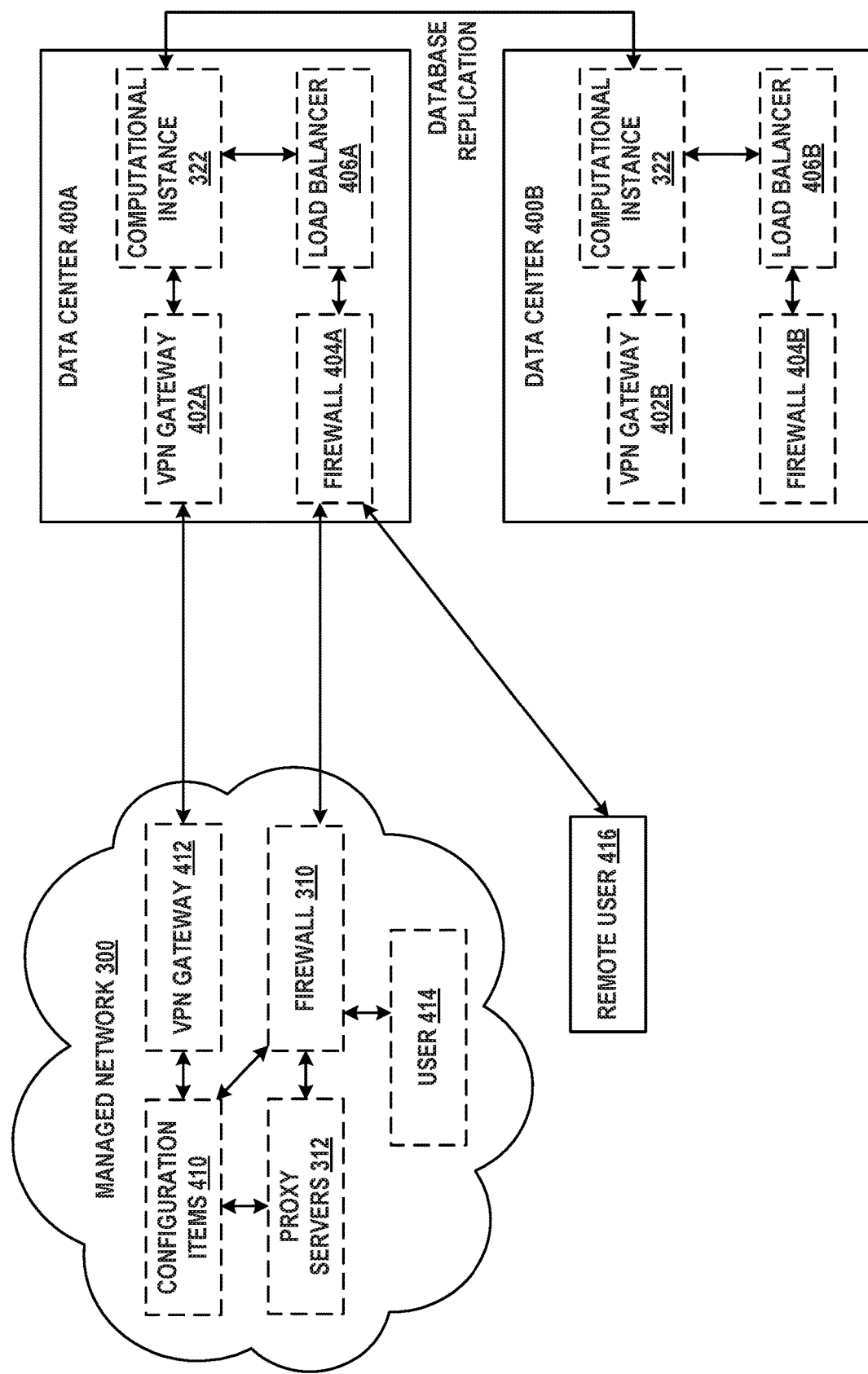
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
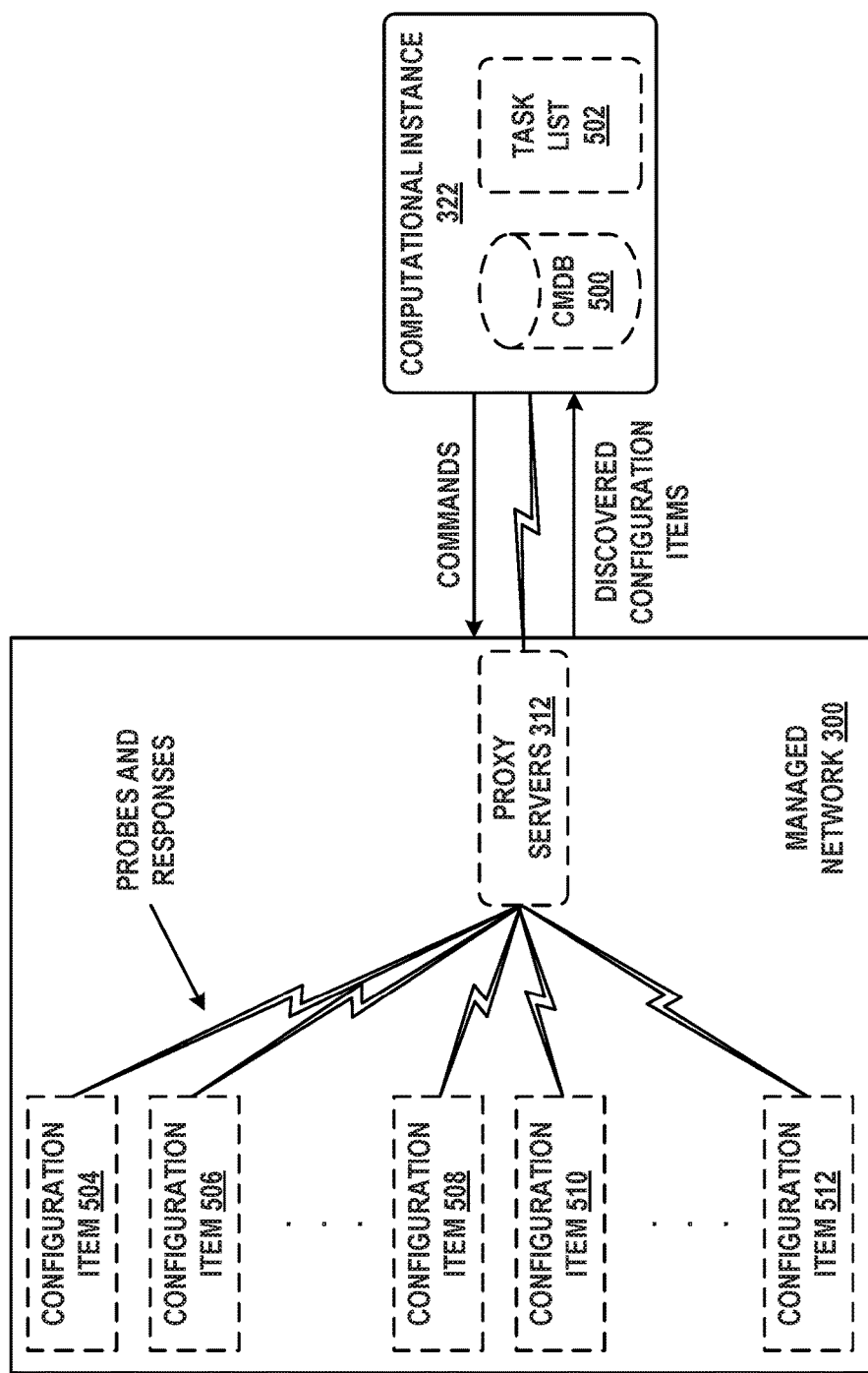
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
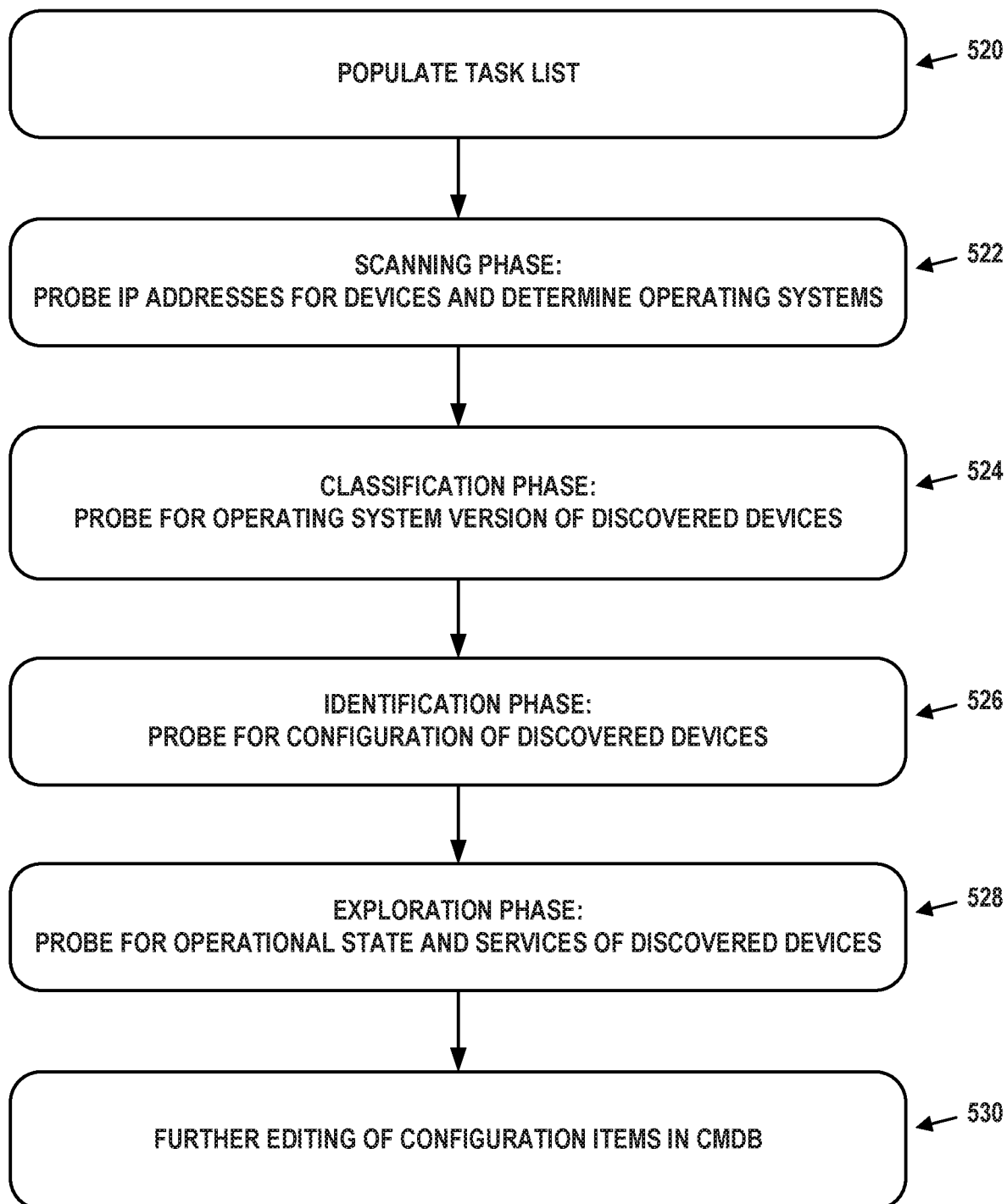
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. IMPROVED CMDB SEARCH

As described above, the CMDB may include configuration items, many of which may be interrelated in various ways. For instance, certain configuration items may reference data from other configuration items or may be partially or entirely contained within other configuration items. As a managed network scales in size, the number of configuration items in the CMDB, as well as the complexity of the interrelationships of the configuration items, may similarly scale. As such, locating a particular configuration item or data within a particular configuration item can be difficult without knowing specific information about the item or data, such as how the item or data is related to various other configuration items. Example embodiments are provided below that describe systems and methods for searching the CMDB in a manner that helps to address these or other issues.

Figure 6:
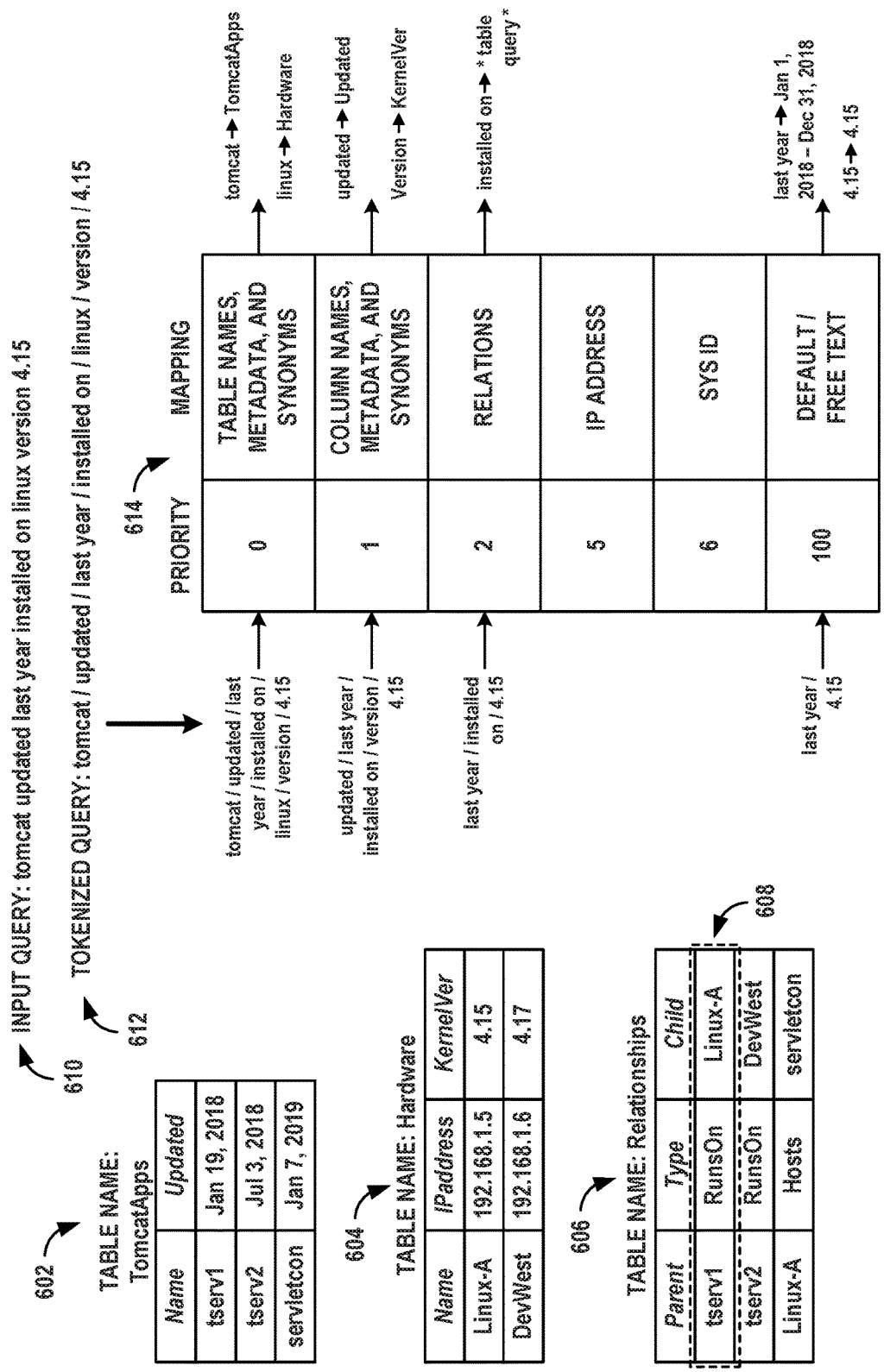
FIG. 6 represents grammar-based searching of tables in a CMDB, in accordance with example embodiments.

FIG. 6 depicts an overview of CMDB searching functionality provided by a search tool, according to an example embodiment. In this example, the CMDB includes a table 602 and a table 604, and the search tool can be used to locate and access these tables and/or data within these tables representing configuration items. Nonetheless, the search functionality described herein is not limited to database tables and can be extended to any type of data representation, knowledgebase, file system, incident records, etc.

The table 602 is a table named "TomcatApps" and includes data identifying various instances of the Apache TOMCAT® servlet running on the managed network. Namely, configuration item 602 identifies the names of the servlet instances and dates when the servlets were last updated. The table 604 is a table named "Hardware" and includes data identifying various server devices of the managed network. Namely, configuration item 604 identifies the names of the server devices, the IP addresses of the server devices, and the version of the server devices' operating system kernels.

As noted above, the CMDB may define relationships between configuration items, such as between the table 602 and the table 604. For instance, if a servlet identified by the table 602 is running on a server identified by the table 604, then this relationship can be defined in the CMDB by creating and storing a record indicative of the relationship.

FIG. 6 further depicts an example of a relationship table 606 that may be stored in the CMDB to define the various relationships between configuration items in the CMDB. As shown, the relationship table 606 includes data fields for identifying parent configuration item data, child configuration item data, and the manner of the relationship between the parent data and the child data. In the present example, the servlet application "tserv1" identified by the table 602 runs on the server "Linux-A" identified by the table 604. As such, the relationship table 606 includes a record 608 defining this relationship by specifying the parent data as the "tserv1" data field from the table 602, the child data as the "Linux-A" data field from the table 604, and the relationship as "RunsOn." The relationship table 606 further includes records indicating that the servlet application "tserv2" identified by the table 602 runs on the server "DevWest" identified by the table 604, and that the server "Linux-A" identified by the table 604 hosts the servlet application "servletcon" identified by the table 602. In some embodiments, each parent and child item in the relationship table 606 may be referred to by a Sys ID or some other type of unique identifier rather than by name.

In line with the discussion above, relationships defined among configuration items can become somewhat complex, such that it can be difficult to locate and access configuration item data without knowing specific details about the configuration item data. For instance, a user of the managed network may wish to determine information about a server device on which the servlet application "tserv1" is running, but the user might not know the name or IP address of the server device. In an attempt to locate this information, the user may locate and access the table 602, such as by performing a textual search of the CMDB for the term "tserv1." However, upon accessing the table 602, the user may realize that the table 602 does not include information identifying the server device that runs the servlet application "tserv1." The user could then access the relationship table 606 to see if the servlet application data in the table 602 is related to any other configuration items. Doing so may inform the user that the "tserv1" application runs on the "Linux-A" server and may direct the user to the table 604, where the user can find information about the server device "Linux-A." Searching the CMDB for data in this manner can be tedious and becomes increasingly cumbersome if the user needs to navigate through multiple iterations of related configuration items before arriving at the desired information. Accordingly, an improved system for searching data in the CMDB is desired.

Still referring to FIG. 6, an example search functionality is depicted to demonstrate how configuration item data can be located using a plain language search query 610. The search query 610 may be a plain language query that includes various information about configuration item data that the user would like to locate. In the illustrated example, a user wishes to locate configuration item data for an Apache TOMCAT® servlet. The user knows the servlet was updated in the previous year and that it was installed on a LINUX® operating system with kernel version 4.15. Accordingly, as shown in FIG. 6, the user may input the search query 610 as "tomcat updated last year installed on linux version 4.15."

Upon receiving the search query 610, the search tool may perform a tokenization process by which the search tool groups the terms of the search query into tokens. By default, each search term may be represented as its own token. However, certain terms may be grouped together into the same token. For instance, the search tool may reference a list of predefined tokens that include terms that may be grouped together as a single token or may additionally or alternatively employ logic to identify which search terms to group together into a single token.

When grouping terms into tokens, the search tool may be configured to use a greedy algorithm that group terms into the longest acceptable token. For instance, a search query might include the phrase "apache tomcat servlet," and, during the tokenization process, the search tool may identify acceptable tokens to be: (i) "apache," (ii) "tomcat," (iii) "servlet," (iv) "apache tomcat," (v) "tomcat servlet," and (vi) "apache tomcat servlet." And according to the greedy grouping algorithm, the search tool may tokenize the entire phrase "apache tomcat servlet" into a single token.

Words that the search tool may group together into a single token include multi-word phrases that are commonly used or expected to be used in connection with the CMDB, such as multi-word names of configuration items or phrases included in metadata associated with configuration items, or multi-word phrases that are commonly used in plain language. Examples of words that might be grouped with one or more other words into a single token include prepositions, adjectives, and adverbs, such that the search tool may be configured to identify these types of words and group them together with the preceding and/or the following word in the search query. Other examples are possible as well. In the present example, when tokenizing the search query 610, the search tool may group the words "last year" into a single token and may similarly group the words "installed on" into a single token, while the remaining terms of the search query may each correspond to individual respective tokens. FIG. 6 depicts this tokenized search query 612 with each token separated by a "/".

Once the search tool has tokenized the query 610 into tokens, the search tool may then classify each token as a particular token type. Examples of token types may include a "table" token type, a "column" token type, a "relation" token type, an "IP address" token type, a "Sys ID" token type, or a "free text" token type. A token may be classified as a "table" token if the token is indicative of a table stored in the CMDB. A token may be classified as a "column" token if the token is indicative of a column of a table in the CMDB. A token may be classified as a "relation" token if the token is indicative of a defined relationship between configuration items in the CMDB, such as those defined in the relationship table 606. A token may be classified as an "IP address" token if the token is indicative of an IP address. A token may be classified as a "Sys ID" token if the token is indicative of a system ID, which may be a unique identifier of a particular record of a configuration item. And a token may be classified as a "free text" token by default if the token is not classified as any other type of token. This list of example token types is meant to be illustrative, however, and the functionality of the search tool is not necessarily limited to these token types.

In order to classify each token as a particular token type, the search tool may use a mapping scheme 614. The mapping scheme 614 may be a predefined scheme that maps a token to a particular token type based on the search terms that are included in the token. In some examples, the mapping scheme 614 may define, for each token type, a list of terms or phrases of terms associated with that token type. The search tool may then determine whether the search query term or terms included in a particular token are within a list of terms for a token type and responsively map that token to that token type.

For instance, with respect to the "table" token type, the mapping scheme 614 may define a list of terms and phrases that includes names of tables, metadata associated with tables, and synonyms or other terms and phrases that are similar to the table names and/or the metadata. Similar schemes may be applied to some or all of the other token types as well.

Additionally or alternatively, the mapping scheme 614 may define logical rules for mapping a token to a token type, such as rules based on a format of a token. For instance, the mapping scheme 614 may define rules for classifying a token as an "IP address" token based on the token having a format that is expected of an IP address (e.g., four numbers between 0 and 255, each separated by a period). Similar schemes may be applied to some or all of the other token types as well.

As further shown in FIG. 6, the mapping scheme 614 may define a priority for classifying tokens, and the search tool may attempt to classify tokens in an order based on the priority defined by the mapping scheme 614. In the present example, the search tool may first determine whether any token can be classified as a "table" token type, followed by a "column" token type, a "relation" token type, an "IP address" token type, and a "SysID" token type. And any tokens that the search tool does not classify as one of the above token types is then classified as a "free text" token type, which is the lowest priority classification. Other priority arrangements are possible as well.

When processing the tokenized search query 612 to identify any "table" tokens, the search tool may determine that the "tomcat" token is a "table" token. As noted above, the search tool may be configured to classify tokens of table names or synonyms of table names as "table" tokens, based on the mapping scheme 614. In the present example, the table 602 is a table named "TomcatApps," and the mapping scheme 614 may define "tomcat" as a similar or synonymous term to the table name "TomcatApps." As such, using the mapping scheme 614, the search tool may classify the "tomcat" token as a "table" token. Similarly, the mapping scheme 614 may define the term "linux" as a similar or synonymous term to the table name "Hardware," such that the search tool may classify the "linux" token as a "table" token. And the search tool may refrain from classifying any of the remaining tokens as "table" tokens, based on the remaining tokens failing to correspond to a table name, table metadata, or a synonymous or similar term.

After processing the tokenized search query 612 to identify "table" tokens, the search tool may process any remaining unclassified tokens to identify "column" tokens, for instance, based on whether any of these remaining tokens correspond to a column name, column metadata, or a synonymous or similar term. In the present example, the term "updated" is a name of a column in the table 602, and the mapping scheme 614 may define the term "version" as a synonym for the column name "Kernel Ver" in the table 604. As such, the search tool may classify the "updated" token and the "version" token as "column" tokens. And the search tool may refrain from classifying any of the remaining tokens as "column" tokens, based on the remaining tokens failing to correspond to a column name, column metadata, or a synonymous or similar term.

After processing the remaining terms of the tokenized search query 612 to identify "column" tokens, the search tool may process any remaining unclassified tokens to identify "relation" tokens, for instance, based on whether any of these remaining tokens correspond to a predefined relational term or phrase, such as those specified in the relationship table 608, or based on any other logic that identifies a token as a relational term or phrase, in line with the discussion above. In the present example, the mapping scheme 614 may define the phrase "installed on" as a relational phrase or as a similar phrase to the relationship types "RunsOn" and/or "Hosts" specified in the relationship table 608. As such, the search tool may classify the "installed on" token as a "relation" token. And the search tool may refrain from classifying any of the remaining tokens as "relation" tokens, based on the remaining tokens failing to correspond to a relational phrase.

After processing the remaining terms of the tokenized search query 612 to identify "relation" tokens, the search tool may process any remaining unclassified tokens to identify "IP address" tokens, for instance, based on whether any of these remaining tokens correspond to a predefined IP address or a format expected of an IP address, as described above. In the present example, none of the remaining terms of the tokenized search query 612 correspond to a predefined IP address or have a format that corresponds to an IP address. As such, the search tool may refrain from classifying any of the remaining tokens as "IP address" tokens.

After processing the remaining terms of the tokenized search query 612 to identify "IP address" tokens, the search tool may process any remaining unclassified tokens to identify "Sys ID" tokens, for instance, based on whether any of these remaining tokens correspond to a predefined Sys ID or a format expected of a Sys ID. In the present example, none of the remaining terms of the tokenized search query 612 correspond to a predefined Sys ID or have a format that corresponds to a Sys ID. As such, the search tool may refrain from classifying any of the remaining tokens as "Sys ID" tokens.

And finally, after processing the tokenized search query 612 to identify the various tokens described above, the search tool may default to classifying the remaining tokens as "free text" tokens. In the present example, the remaining "last year" token and "4.15" token are classified as "free text" tokens. When using the "free text" tokens to determine and carry out a search of the CMDB, as described in further detail below, the search tool may treat the "free text" tokens as possible values for data stored in table fields of configuration items.

In some examples, the search tool may be configured to further process the "free text" tokens in various ways. For instance, the search tool may be configured to determine whether a "free text" token includes text that corresponds to a time or date, such as by comparing the text to various definitions of predefined text that are known to correspond to a time or date. And upon detecting such text, the search tool may convert the text into a numerical representation of the time or date, or into some other format that conforms to the time or date standards used by the CMDB. In the present example, the search tool may determine that the text "last year" corresponds to a time period. Namely, the search tool may determine that the text "last year" corresponds to a year that is equivalent to the current year minus one year. Based on the current year being 2019, the search tool may determine that "last year" corresponds to the year 2018 and may represent that year as a range of dates beginning at Jan. 1, 2018 and ending at Dec. 31, 2018. Other examples are possible as well.

Further, in some examples, the search tool may be configured to disregard or discard certain tokens from the tokenized query 612. For instance, plain language searches might include words that are commonly used in spoken language, but do not necessarily aid the search tool in locating a desired configuration item. These terms may be referred to as "stop words." Accordingly, when classifying a search term, the search tool may access a list of stop words and compare the term to the list. If the term is present in the list of stop words, then the search tool may disregard the term from the search query. Examples of stop words might include "a" or "the." In some examples, a user can customize the list of stop words by accessing the list and adding, removing, or changing one or more of the stop words.

When classifying the tokens as described above, the search tool may further associate classified tokens with various configuration items in the CMDB. For instance, with respect to "table" tokens, the mapping scheme 614 may specify a table associated with each of the table names, table metadata, and synonyms. For instance, because the table 602 is named "TomcatApps," the mapping scheme 614 may specify that the table name "TomcatApps" and any related metadata or synonymous terms (including "tomcat") are associated with the table 602. Based on this specification, when the search tool classifies the "tomcat" token as a "table" token, the search tool may also associate that token with the table 602.

Once the search tool has classified the tokens in the tokenized query 612, the search tool may determine a search strategy based on the classified tokens. In some examples, determining the search strategy based on the classified tokens may involve correlating the search query to a grammar definition. A grammar definition may include a predefined arrangement of token types, and correlating the search query to a particular grammar definition may involve determining whether the arrangement of the classified tokens in the query satisfies the arrangement of token types in the particular grammar definition.

Grammar definitions may take various forms. An example of a grammar definition 616 is depicted in FIG. 6. As shown, the grammar definition 616 is depicted as a regular expression, where the quantifiers "+" and "?" correspond to "one or more" and "zero or one," respectively. Accordingly, the grammar definition 616 defines a search query that contains a "table" token, followed by one or more "column" tokens and data values, followed by zero or more "relation" tokens, followed by a "table" token, followed by one or more "column" tokens and data values. As noted above, the search tool may treat the "free text" tokens as values of data fields, such that the "last year" token (which the search tool reconfigures as a range of dates spanning the year 2018) and the "4.15" token are treated as values.

The search tool may be configured to recognize multiple different grammar definitions, each of which may vary in length, complexity, and/or in arrangement of token types. For instance, a simpler version of the grammar definition 616 may be represented as "table+," such that, in order for a search query to comply with the grammar definition 616, the query merely needs to include one or more "table" tokens. Other examples are possible as well.

In any case, each grammar definition may be associated with a particular search strategy for searching the CMDB. And when the search tool determines that a search query complies with a particular grammar definition, the search tool may responsively carry out the search strategy associated with that grammar definition.

As described above, the grammar definition 616 depicted in FIG. 6 includes a first table followed by first column and first value data, a second table followed by second column and second value data, and a possible relation in between. For such a grammar definition, an associated search strategy may involve searching the first table for first records that correspond to the first column and first value data, searching the second table for second records that correspond to the second column and second value data, and using the relationship table 608 to determine which, if any, of the first records of the first table are related to the second records of the second table.

In the present example, the first table corresponds to the table 602, the first column data corresponds to the "Updated" column in the table 602, and the first value data corresponds to dates between Jan. 1, 2018 and Dec. 31, 2018. As such, searching the first table for first records that correspond to the first column and first value data would return records corresponding to the "tserv1" and "tserv2" servlet applications, which were both updated in 2018. Continuing the example, the second table corresponds to the table 604, the second column data corresponds to the "Kernel Ver" column in the table 604, and the second value data corresponds to "4.15." As such, searching the second table for second records that correspond to the second column and second value data would return a record corresponding to the "Linux-A" server, which has a kernel version of 4.15. Using the relationship table 608, the search tool may determine that "tserv1" runs on "Linux-A," while "tserv2" runs on "DevWest." But the search of the second table only returned a record for "Linux-A" and not "DevWest." Therefore, because the records identified in the first and second tables only overlap in connection with the relationship between the "tserv1" record and the "Linux-A" record, the ultimate query output 618 of the search tool may be the "tserv1" record and the "Linux-A" record.

In some examples, the search tool may limit the query output 618 to certain records based on an order of the tokens in the tokenized query 612. For instance, when a user inputs a plain language query, the user is likely to input terms that are more indicative of the desired search result near the beginning of the query. For instance, in the present example, the user is attempting to identify a particular TOMCAT® servlet based on when it was updated and the operating system it was installed on, and so the example query begins with the term "tomcat." And because a user is more likely to input terms that are more indicative of the user's desired search result near the beginning, the search tool may limit the query output to records that are associated with configuration items associated with tokens at or near the beginning of the search query. Further applying this concept to the present example, the first token of the tokenized query 612 is the "tomcat" token, which the search tool associates with the table 602 based on the mapping scheme 614, as described above, while the "linux" token associated with the table 604 appears later in the query. As such, when the searching tool generates an output query that includes records from both the table 602 and the table 604, as described above, the searching tool may limit the output query to only include records from the table 602. Accordingly, as shown in FIG. 6, the searching tool may provide only the "tserv1" record as the query output 618.

Various aspects of the search tool functionality may be altered to achieve similar results. For instance, while the discussion above describes determining a search strategy based on the query complying with a grammar definition, the search strategy may be selected in various ways. In some examples, the tokenized and classified search query may be arranged in a hierarchical structure, and a corresponding search strategy may be determined based on an arrangement of certain hierarchical tiers of the structure.

Figure 7:
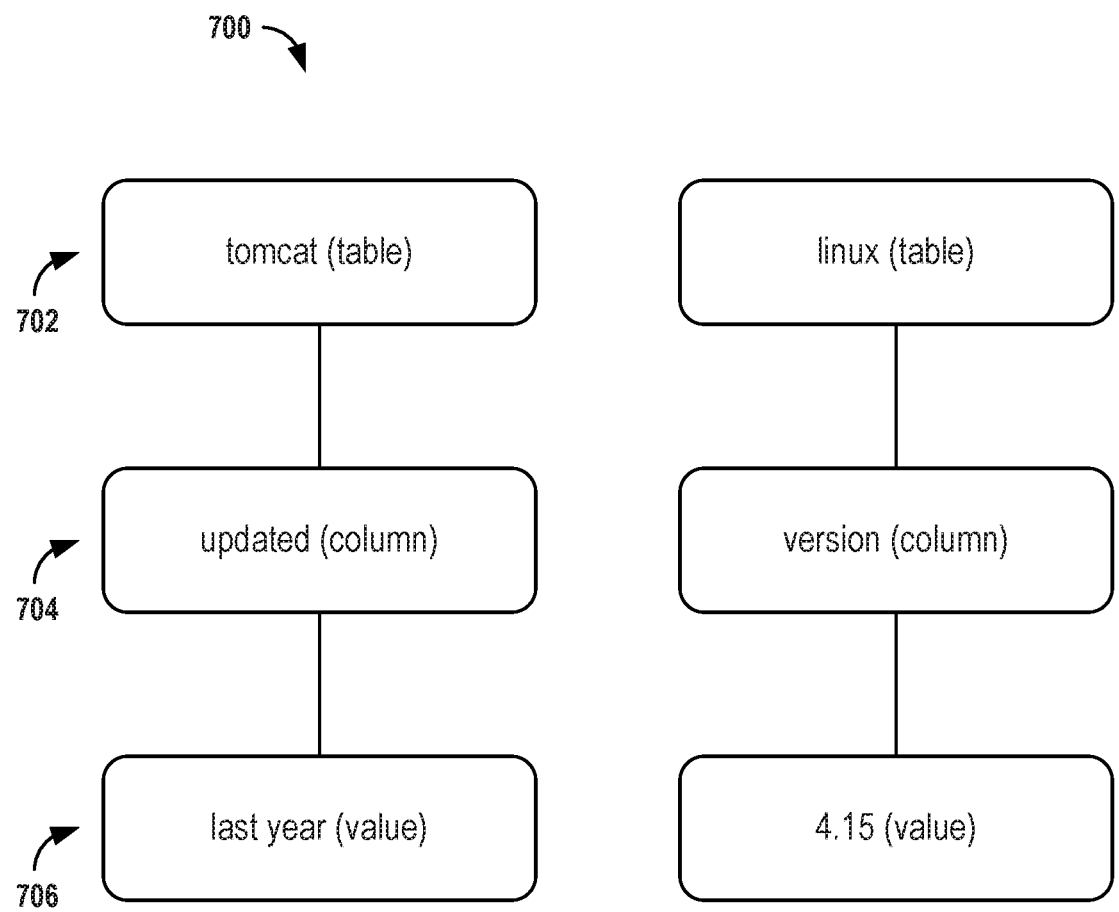
FIG. 7 is a hierarchical representation of a search strategy applied to a search query, in accordance with example embodiments.

FIG. 7 illustrates an example of the search query 610 after the search tool has tokenized and classified the search query 610 and arranged the tokens in a hierarchical format 700. In the hierarchical format, the tokens may be arranged based the priorities of their types as defined by the mapping scheme 614. For instance, "table" tokens may be arranged in a top tier 702, "column" tokens in a middle tier 704, and "value" tokens in a bottom tier 706. Further, the "updated" column token extends from the "tomcat" table token, as the "updated" column token follows the "tomcat" table token in the query 612. Likewise, the "last year" value token extends from the "updated" column token, as the "last year" value token follows the "updated" column token in the query 612. And a similar structure is applied to the "linux" table token, "version" column token, and "4.15" value token based on their positions in the query 612. This has the effect of interpreting a column in a search query to belong to the table that it most immediately follows in the search query. Likewise, a value in a search query may belong to the column that it most immediately follows in the search query.

In the present example, "IP address" tokens and "Sys ID" tokens are not depicted because the tokenized query 612 does not include these token types. However, in other examples where the query includes these token types, these tokens may be arranged in the appropriate tiers of the hierarchical format 700 according to their priorities (e.g., below "column" tokens and above "value" tokens). And the hierarchical format 700 also excludes the "relation" token, as the search tool may be configured to assume the presence of a relationship between the tokens based on the user's inclusion of the tokens in the same search query. Thus, the hierarchical format 700 can take the form of a tree, with table identified as the root node, columns identified as child nodes of the root, values as respective children to the columns, etc.

As noted above, the hierarchical format 700 may be matched to a search strategy based on an arrangement of certain tiers of the hierarchy. For instance, the search tool may match the hierarchical format 700 to a search strategy based on the top tier 702 alone. Here, the top tier 702 includes two table tokens, and so the search tool may determine that an appropriate strategy involves searching the two tables that correspond to the two table tokens in the manner described above in connection with FIG. 6. Namely, the search tool may search the two tables for any column, value, or other data arranged in the hierarchy below the tables, and the search tool may refine the returned data by discarding any data that does not correspond to a relationship between the two tables as defined by the CMDB.

VII. EXAMPLE OPERATIONS

Figure 8:
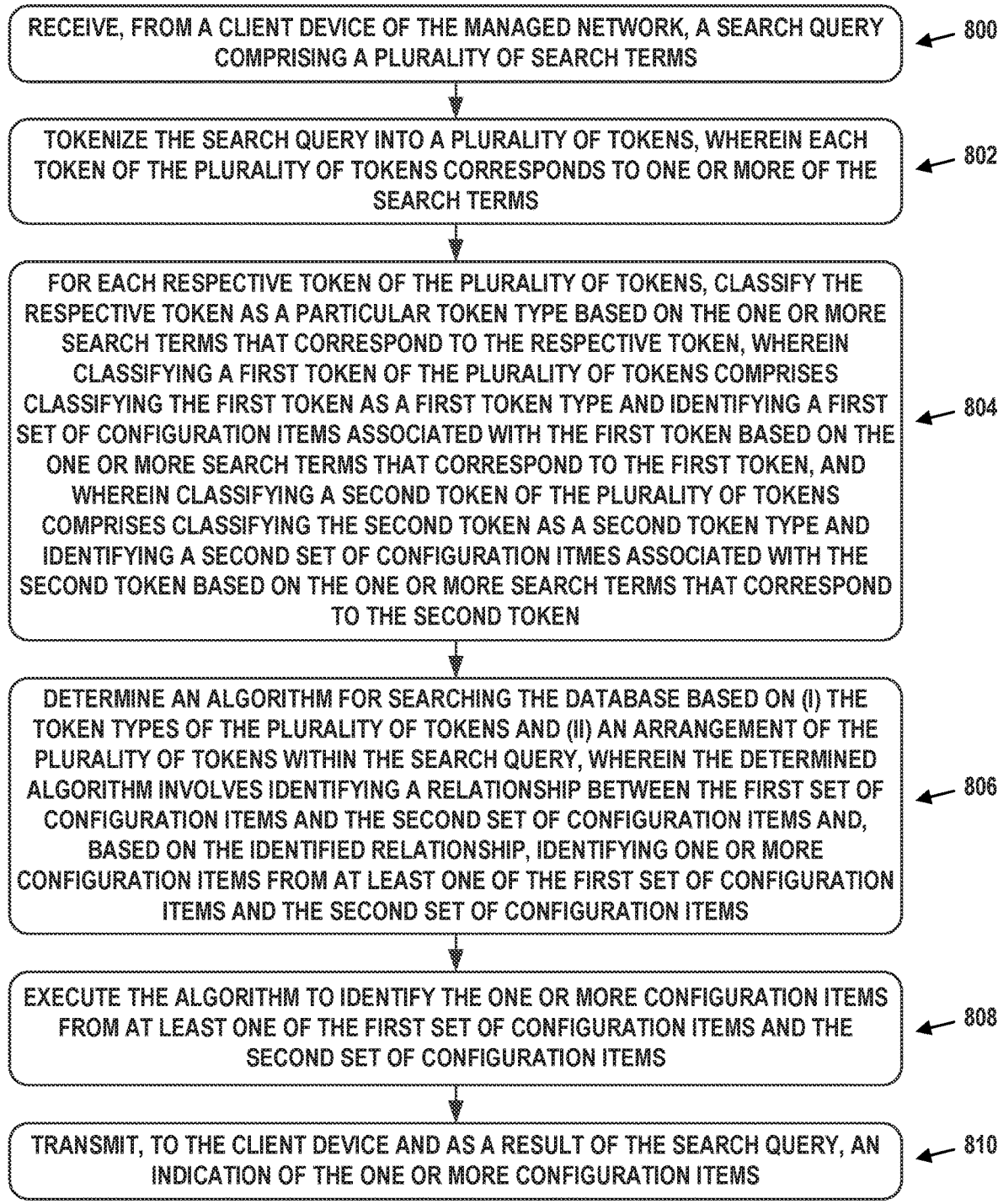
FIG. 8 is a flow chart, in accordance with example embodiments.

FIG. 8 is a flow chart illustrating an example embodiment. The processes illustrated by FIG. 8 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

The embodiments of FIG. 8 may be carried out in connection with a database of a remote network management platform. The database may contain representations of configuration items that relate to computing devices and software applications disposed within a managed network associated with the remote network management platform. One or more server devices of the remote network management platform may be configured to carry out the operations described in connection with the embodiments of FIG. 8.

Block 800 may involve receiving, from a client device of the managed network, a search query comprising a plurality of search terms.

Block 802 may involve tokenizing the search query into a plurality of tokens, where each token of the plurality of tokens corresponds to one or more of the search terms.

Block 804 may involve, for each respective token of the plurality of tokens, classifying the respective token as a particular token type based on the one or more search terms that correspond to the respective token. Classifying a first token of the plurality of tokens may involve classifying the first token as a first token type and identifying a first set of configuration items associated with the first token based on the one or more search terms that correspond to the first token. For instance, in line with the discussion above in connection with FIG. 6, the "tomcat" token may be classified as a "table" token and may be associated with the table 602 based on the term "tomcat" being synonymous or similar to the name of the table 602. Likewise, classifying a second token of the plurality of tokens may involve classifying the second token as a second token type and identifying a second set of configuration items associated with the second token based on the one or more search terms that correspond to the second token.

Block 806 may involve determining an algorithm for searching the database based on (i) the token types of the plurality of tokens and (ii) an arrangement of the plurality of tokens within the search query. For instance, in line with the discussion above in connection with FIG. 6, the types and arrangement of tokens in the tokenized query 612 may adhere to a particular grammar definition, such as the grammar definition 616. And based on that grammar definition, a corresponding search algorithm may be determined. The determined algorithm may involve identifying a relationship between the first set of configuration items and the second set of configuration items and, based on the identified relationship, identifying one or more configuration items from at least one of the first set of configuration items and the second set of configuration items. For instance, in line with the discussion above in connection with FIG. 6, the search algorithm may be configured to determine a relationship between the table 602 and the table 604 based on the relationship table 606, and then identify configuration items disposed in the table 602 and the table 604 that correspond to the determined relationship.

Block 808 may involve executing the algorithm to identify the one or more configuration items from at least one of the first set of configuration items and the second set of configuration items.

Block 810 may involve transmitting, to the client device and as a result of the search query, an indication of the one or more configuration items.

In some embodiments, the database may further contain a representation of a mapping scheme that maps a list of terms to token types. In these embodiments, classifying the token as the particular token type based on the one or more search terms that correspond to the token may involve determining that the mapping scheme maps the one or more search terms that correspond to the token to the particular token type.

In some embodiments, the first set of configuration items associated with the first token may be disposed within a first database table contained in the database. In these embodiments, classifying the first token as the first token type may involve: determining that the one or more search terms that correspond to the first token are associated with a name of the first database table, and, responsive to determining that the one or more search terms that correspond to the first token are associated with the name of the first database table, classifying the first token as a database table token type.

In some embodiments, the second set of configuration items associated with the second token may be disposed within a second database table contained in the database. In these embodiments, classifying the second token as the second token type may involve: determining that the one or more search terms that correspond to the second token are associated with a name of the second database table, and, responsive to determining that the one or more search terms that correspond to the second token are associated with the name of the second database table, classifying the second token as a database table token type.

In some embodiments, determining the algorithm for searching the database may involve determining an algorithm that identifies a first configuration item from the first database table and a second configuration item from the second database table based on the identified relationship indicating an association between the first and second configuration items.

Figure 9:
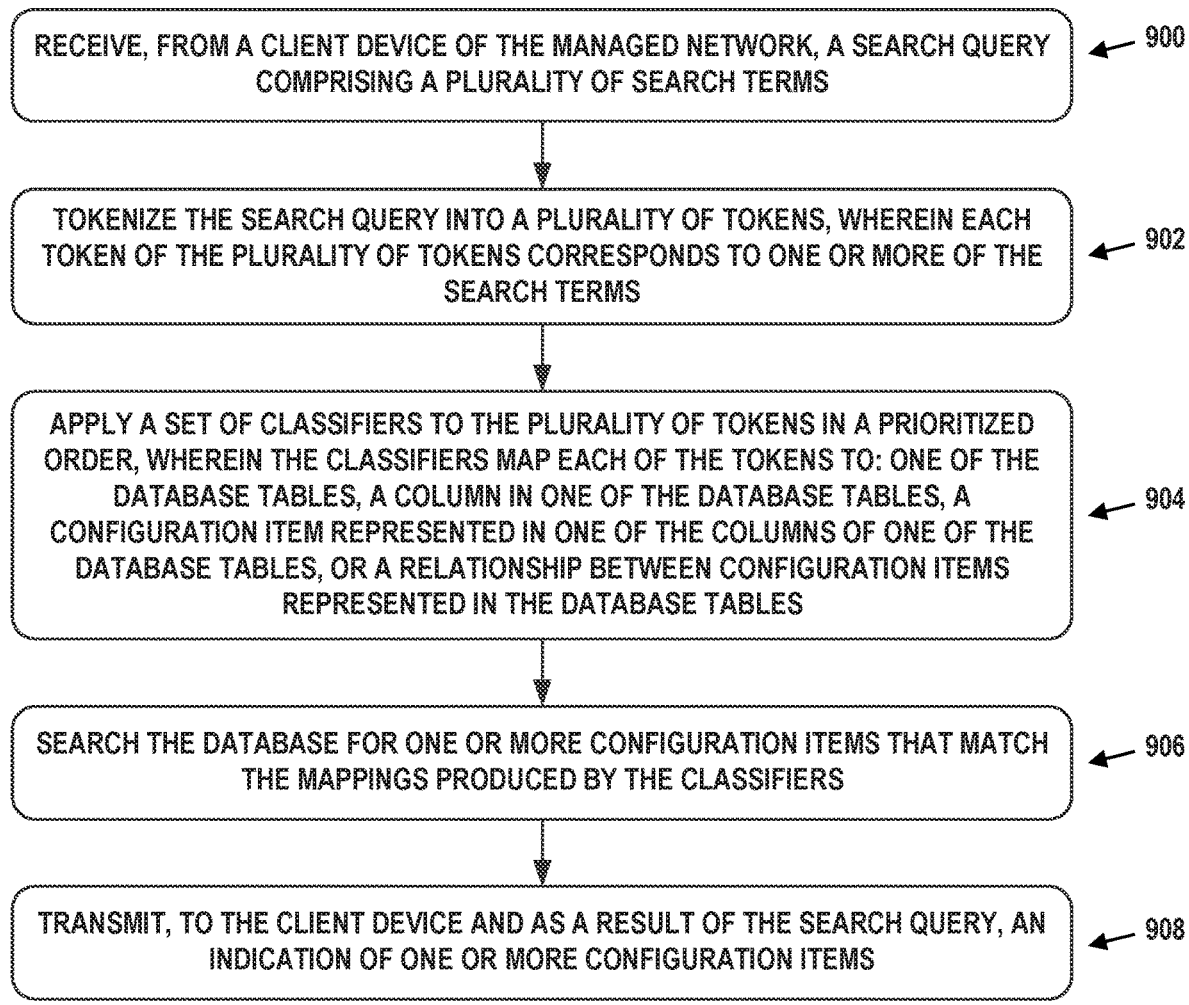
FIG. 9 is a flow chart, in accordance with example embodiments.

FIG. 9 is a flow chart illustrating an example embodiment. The processes illustrated by FIG. 9 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

The embodiments of FIG. 9 may be carried out in connection with a database of a remote network management platform. The database may contain representations of configuration items that relate to computing devices and software applications disposed within a managed network associated with the remote network management platform. One or more server devices of the remote network management platform may be configured to carry out the operations described in connection with the embodiments of FIG. 9.

Block 900 may involve receiving, from a client device of the managed network, a search query comprising a plurality of search terms.

Block 902 may involve tokenizing the search query into a plurality of tokens, where each token of the plurality of tokens corresponds to one or more of the search terms.

Block 904 may involve applying a set of classifiers to the plurality of tokens in a prioritized order. The classifiers may map each of the tokens to: one of the database tables, a column in one of the database tables, a configuration item represented in one of the columns of one of the database tables, or a relationship between configuration items represented in the database tables.

Block 906 may involve searching the database for one or more configuration items that match the mappings produced by the classifiers.

Block 908 may involve transmitting, to the client device and as a result of the search query, an indication of one or more configuration items.

In some embodiments, the plurality of search terms may include a first term juxtaposed with a second term (e.g., the first term and the second term are next to one another in the query), and the embodiments of FIGS. 8 and 9 may further involve determining that the juxtaposed first and second terms form at least part of a phrase associated with one or more of the configuration items. In these embodiments, tokenizing the search query may involve representing the first term and the second term as a single token based on determining that the juxtaposed first and second terms form at least part of a phrase associated with one or more of the configuration items.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform comprising:

persistent storage containing representations of configuration items of a managed network and parent-child relationships between the configuration items within the managed network, wherein the configuration items correspond to computing devices and software applications disposed within the managed network, wherein the managed network is associated with the remote network management platform; and one or more server devices comprising processing circuitry configured to:

receive, from a client device of the managed network, a search query comprising a plurality of search terms;

tokenize the search query into a plurality of tokens, wherein each token of the plurality of tokens corresponds to one or more of the search terms;

for each respective token of the plurality of tokens, classify the respective token as a particular token type based on the one or more of the search terms that correspond to the respective token, wherein classifying a first token of the plurality of tokens comprises classifying the first token as a first token type and identifying a first set of configuration items associated with the first token based on the one or more of the search terms that correspond to the first token, and wherein classifying a second token of the plurality of tokens comprises classifying the second token as a second token type and identifying a second set of configuration items associated with the second token based on the one or more of the search terms that correspond to the second token;

determine an algorithm for searching the persistent storage based on (i) the token types of the plurality of tokens and (ii) an arrangement of the plurality of tokens within the search query, wherein the determined algorithm involves identifying, within the persistent storage, a parent-child relationship between the first set of configuration items and the second set of configuration items and, based on the identified parent-child relationship, identifying one or more configuration items from at least one of the first set of configuration items and the second set of configuration items;

execute the algorithm to identify the one or more configuration items from at least one of the first set of configuration items and the second set of configuration items; and transmit, to the client device and as a result of the search query, an indication of the identified one or more configuration items.

2. The remote network management platform of claim 1, wherein the plurality of search terms comprises a first term juxtaposed with a second term, wherein the processing circuitry of the one or more server devices is further configured to determine that the juxtaposed first and second terms form at least part of a phrase associated with one or more of the configuration items, and wherein tokenizing the search query comprises representing the first term and the second term as a single token based on determining that the juxtaposed first and second terms form at least part of a phrase associated with one or more of the configuration items.

3. The remote network management platform of claim 1, wherein the persistent storage further contains a representation of a mapping scheme that maps a list of terms to token types, and wherein classifying the respective token as the particular token type based on the one or more of the search terms that correspond to the respective token comprises determining that the mapping scheme maps the one or more of the search terms that correspond to the respective token to the particular token type, wherein the token type is selected from the group consisting of: a database table token type, a database column token type, a relation token type, a system identifier (ID) token type, and a free text token type.

4. The remote network management platform of claim 1, wherein the first set of configuration items associated with the first token is disposed within a first database table contained in the persistent storage, and wherein classifying the first token as the first token type comprises:

determining that the one or more of the search terms that correspond to the first token are associated with a name of the first database table; and responsive to determining that the one or more of the search terms that correspond to the first token are associated with the name of the first database table, classifying the first token as a database table token type.

5. The remote network management platform of claim 4, wherein the second set of configuration items associated with the second token is disposed within a second database table contained in the persistent storage, and wherein classifying the second token as the second token type comprises:

determining that the one or more of the search terms that correspond to the second token are associated with a name of the second database table; and responsive to determining that the one or more of the search terms that correspond to the second token are associated with the name of the second database table, classifying the second token as a database table token type.

6. The remote network management platform of claim 5, wherein determining the algorithm for searching the persistent storage comprises determining an algorithm that identifies a first configuration item from the first database table and a second configuration item from the second database table based on the identified parent-child relationship indicating an association between the first and second configuration items.

7. The remote network management platform of claim 1, wherein the persistent storage further contains a plurality of grammar definitions, each grammar definition representing a predefined arrangement of token types and corresponding to a respective algorithm for searching the persistent storage, and wherein determining the algorithm for searching the persistent storage comprises:

determining that an arrangement of the plurality of tokens in the search query matches a particular grammar definition; and determining the algorithm to be the respective algorithm that corresponds to the particular grammar definition.

8. The remote network management platform of claim 1, wherein classifying the first token as the first token type comprises:

determining that the one or more of the search terms that correspond to the first token are associated with a name of a column of a database table contained in the persistent storage; and responsive to determining that the one or more of the search terms that correspond to the first token are associated with the name of the column, classifying the first token as a column token type.

9. The remote network management platform of claim 1, wherein classifying the first token as the first token type comprises:

determining that the one or more of the search terms that correspond to the first token are associated with a relational phrase; and responsive to determining that the one or more of the search terms that correspond to the first token are associated with a relational phrase, classifying the first token as a relation token type.

10. The remote network management platform of claim 1, wherein the parent-child relationship indicates that the first set of configuration items runs on the second set of configuration items within the managed network.

11. The remote network management platform of claim 1, wherein the parent-child relationship indicates that the first set of configuration items hosts the second set of configuration items within the managed network.

12. A method for use in connection with persistent storage of a remote network management platform, wherein the persistent storage contains representations of configuration items of a managed network associated with the remote network management platform and contains parent-child relationships between the configuration items within the managed network, wherein the configuration items correspond to computing devices and software applications disposed within the managed network, the method comprising:

receiving, from a client device of the managed network, a search query comprising a plurality of search terms;

tokenizing the search query into a plurality of tokens, wherein each token of the plurality of tokens corresponds to one or more of the search terms;

for each respective token of the plurality of tokens, classifying the respective token as a particular token type based on the one or more of the search terms that correspond to the respective token, wherein classifying a first token of the plurality of tokens comprises classifying the first token as a first token type and identifying a first set of configuration items associated with the first token based on the one or more of the search terms that correspond to the first token, and wherein classifying a second token of the plurality of tokens comprises classifying the second token as a second token type and identifying a second set of configuration items associated with the second token based on the one or more of the search terms that correspond to the second token;

determining an algorithm for searching the persistent storage based on (i) the token types of the plurality of tokens and (ii) an arrangement of the plurality of tokens within the search query, wherein the determined algorithm involves identifying, within the persistent storage, a parent-child relationship between the first set of configuration items and the second set of configuration items and, based on the identified parent-child relationship, identifying one or more configuration items from at least one of the first set of configuration items and the second set of configuration items;

executing the algorithm to identify the one or more configuration items from at least one of the first set of configuration items and the second set of configuration items; and transmitting, to the client device and as a result of the search query, an indication of the identified one or more configuration items.

13. The method of claim 12, wherein the plurality of search terms comprises a first term juxtaposed with a second term, wherein the method further comprises determining that the juxtaposed first and second terms form at least part of a phrase associated with one or more of the configuration items, and wherein tokenizing the search query comprises representing the first term and the second term as a single token based on determining that the juxtaposed first and second terms form at least part of a phrase associated with one or more of the configuration items.

14. The method of claim 12, wherein the persistent storage further contains a representation of a mapping scheme that maps a list of terms to token types, and wherein classifying the respective token as the particular token type based on the one or more of the search terms that correspond to the respective token comprises determining that the mapping scheme maps the one or more of the search terms that correspond to the respective token to the particular token type.

15. The method of claim 12, wherein the first set of configuration items associated with the first token is disposed within a first database table contained in the persistent storage, wherein the second set of configuration items associated with the second token is disposed within a second database table contained in the persistent storage, and wherein classifying the first token as the first token type comprises:

determining that the one or more of the search terms that correspond to the first token are associated with a name of the first database table; and responsive to determining that the one or more of the search terms that correspond to the first token are associated with the name of the first database table, classifying the first token as a database table token type;

and wherein classifying the second token as the second token type comprises:

determining that the one or more of the search terms that correspond to the second token are associated with a name of the second database table; and responsive to determining that the one or more of the search terms that correspond to the second token are associated with the name of the second database table, classifying the second token as a database table token type;

and wherein determining the algorithm for searching the persistent storage comprises: determining an algorithm that identifies a first configuration item from the first database table and a second configuration item from the second database table based on the identified parent-child relationship indicating a parent-child association between the first and second configuration items.

16. The method of claim 12, wherein the persistent storage further contains a plurality of grammar definitions, each grammar definition representing a predefined arrangement of token types and corresponding to a respective algorithm for searching the persistent storage, and wherein determining the algorithm for searching the persistent storage comprises:

determining that an arrangement of the plurality of tokens in the search query matches a particular grammar definition; and determining the algorithm to be the respective algorithm that corresponds to the particular grammar definition.

17. The method of claim 12, wherein classifying the first token as the first token type comprises:

determining that the one or more of the search terms that correspond to the first token are associated with a name of a column of a database table contained in the persistent storage; and responsive to determining that the one or more of the search terms that correspond to the first token are associated with the name of the column, classifying the first token as a column token type.

18. The method of claim 12, wherein classifying the first token as the first token type comprises:

determining that the one or more of the search terms that correspond to the first token are associated with a relational phrase; and responsive to determining that the one or more of the search terms that correspond to the first token are associated with a relational phrase, classifying the first token as a relation token type.

19. A remote network management platform comprising:

persistent storage containing, in a plurality of database tables, representations of configuration items of a managed network and relationships between the configuration items within the managed, wherein the configuration items correspond to computing devices and software applications disposed within the managed network, wherein the managed network is associated with the remote network management platform; and one or more server devices comprising processing circuitry configured to:

receive, from a client device of the managed network, a search query comprising a plurality of search terms;

tokenize the search query into a plurality of tokens, wherein each token of the plurality of tokens corresponds to one or more of the search terms;

apply a set of classifiers to the plurality of tokens in a prioritized order, wherein the classifiers first attempt to map each token to one of the database tables, and then attempt to map each remaining token to a column in one of the database tables, and then attempt to map each remaining token to a configuration item represented in a column of one of the database tables, and then attempt to map each remaining token to a relationship between configuration items represented in the database tables;

search the persistent storage for one or more configuration items that match the mappings produced by the classifiers; and transmit, to the client device and as a result of the search query, an indication of one or more configuration items.

20. The remote network management platform of claim 19, wherein the persistent storage further contains a plurality of grammar definitions, each grammar definition representing a predefined arrangement of token classifiers and corresponding to a respective algorithm for searching the persistent storage, and wherein searching the persistent storage for one or more configuration items that match the mappings produced by the classifiers comprises:

determining that an arrangement of the applied set of classifiers matches a particular grammar definition; and using the respective algorithm that corresponds to the particular grammar definition to search the persistent storage for the one or more configuration items.

* * * * *

UNITED STATES PATENT AND TRADEMARK OFFICE
CERTIFICATE OF CORRECTION

PATENT NO. : 11,256,699 B2
APPLICATION NO. : 16/373419
DATED : February 22, 2022
INVENTOR(S) : Olga Shaked and Lior Urman It is certified that error appears in the above-identified patent and that said Letters Patent is hereby corrected as shown below:

In the Claims

Column 34, Line 47, Claim 19, please insert --network-- between "managed" and ",".

Signed and Sealed this
Seventeenth Day of May, 2022

Katherine Kelly Vidal
*Director of the United States Patent and Trademark Office*